United States Patent
Chi et al.

(10) Patent No.: US 7,602,551 B2
(45) Date of Patent: Oct. 13, 2009

(54) LIGHT GUIDE PLATE FOR LIQUID CRYSTAL DISPLAY BACK LIGHT UNITS AND LIQUID CRYSTAL DISPLAY BACK LIGHT UNIT USING THE SAME

(75) Inventors: Chul-Goo Chi, Seoul (KR); Man-Suk Kim, Suwon-si (KR); O-Yong Jeong, Yongin-si (KR)

(73) Assignee: Cheil Industries, Inc., Gumi-si, Gyeongsangbuk-do (KR)

( * ) Notice: Subject to any disclaimer, the term of this patent is extended or adjusted under 35 U.S.C. 154(b) by 0 days.

(21) Appl. No.: 11/783,319

(22) Filed: Apr. 9, 2007

(65) Prior Publication Data

US 2007/0189040 A1    Aug. 16, 2007

Related U.S. Application Data

(63) Continuation of application No. PCT/KR2005/003321, filed on Oct. 7, 2005.

(30) Foreign Application Priority Data

Oct. 9, 2004   (KR) .................. 10-2004-0080677
Sep. 12, 2005  (KR) .................. 10-2005-0084462

(51) Int. Cl.
  *G02B 5/02* (2006.01)
  *G02B 5/04* (2006.01)
  *F21V 7/04* (2006.01)

(52) U.S. Cl. .................. 359/599; 359/831; 362/613; 362/626

(58) Field of Classification Search .............. 359/599, 359/707, 831–837; 362/613–626
See application file for complete search history.

(56) References Cited

U.S. PATENT DOCUMENTS

| 5,134,549 | A | * | 7/1992 | Yokoyama | 362/623 |
| 5,408,388 | A | * | 4/1995 | Kobayashi et al. | 362/613 |
| 5,521,797 | A |   | 5/1996 | Kashima et al. | |
| 5,575,549 | A | * | 11/1996 | Ishikawa et al. | 362/625 |
| 5,655,827 | A | * | 8/1997 | Kaneko et al. | 362/613 |
| 5,735,590 | A | * | 4/1998 | Kashima et al. | 362/620 |
| 5,921,651 | A | * | 7/1999 | Ishikawa | 362/624 |
| 6,264,343 | B1 | * | 7/2001 | Miyashita et al. | 362/600 |
| 6,921,178 | B2 |   | 7/2005 | Ohkawa | |
| 2004/0061959 | A1 | * | 4/2004 | Kim | 359/831 |
| 2004/0130883 | A1 | * | 7/2004 | Leu et al. | 362/31 |
| 2006/0133113 | A1 | * | 6/2006 | Koike et al. | 362/626 |

(Continued)

FOREIGN PATENT DOCUMENTS

JP    6-281934    10/1994

(Continued)

*Primary Examiner*—Thong Nguyen
(74) *Attorney, Agent, or Firm*—Lee & Morse, P.C.

(57) ABSTRACT

A light guide plate includes a main body having opposing side faces, and front and rear faces connected to the opposing side faces, the front face being adapted to output light incident on at least one of the side faces, a plurality of front prisms disposed at the front face of the main body, and a plurality of dot prisms disposed in an array at the rear face of the main body, the dot prisms being spaced apart from each other, each of the dot prisms including prism parts, sizes of the dot prisms increasing as a distance from the at least one side face increases.

19 Claims, 6 Drawing Sheets

U.S. PATENT DOCUMENTS

2006/0256581 A1 * 11/2006 Hwang et al. ............... 362/619

FOREIGN PATENT DOCUMENTS

| | | |
|---|---|---|
| JP | 2000-221329 | 8/2000 |
| JP | 2004-006187 | 1/2004 |
| KR | 10-2001-46582 | 6/2001 |
| KR | 10-2004-67780 | 7/2004 |

* cited by examiner

LIGHT GUIDE PLATE FOR LIQUID CRYSTAL DISPLAY BACK LIGHT UNITS AND LIQUID CRYSTAL DISPLAY BACK LIGHT UNIT USING THE SAME

CROSS REFERENCE TO RELATED APPLICATION

This is a continuation application based on pending application Serial No. PCT/KR2005/003321, filed Oct. 7, 2005, the entire contents of which is hereby incorporated by reference.

BACKGROUND OF THE INVENTION

1. Field of the Invention

The present invention relates to a light guide plate for liquid crystal display (LCD) back light units and an LCD back light unit using the same. More particularly, the present invention relates to a light guide plate for LCD back light units, including front prisms and dot prisms formed on front and rear faces, respectively, to increase the brightness and uniformity of light output therefrom, and an LCD back light unit using the same.

2. Description of the Related Art

Generally, a liquid crystal display (LCD) device is a parallel plate capacitor with a dielectric, here a liquid crystal (LC) material, between the plates. A LC material has a liquid form and crystal molecular structure. The LCD also includes multiple selectable electrodes that apply an appropriate electric field to the LC material, allowing figures or images to be displayed.

The LCD device is a passive display device, i.e., it cannot emit light by itself. Therefore, a back light unit that provides light needs to be adjacent the LCD device. Light emitted from the back light unit is provided to a panel of the LCD device having the LC material uniformly arranged therein, where the amount of the light transmitted is controlled to display images. Based on the position of the light source for emitting light, LCD back light units may be classified based on the position of the light source relative to the LCD panel. In a direct-type back light unit, the light source is disposed directly beneath the LCD panel. In an edge-type back light unit, the light source is disposed at the side of the LCD panel.

When an edge-type back light unit is used, light may not be uniformly transmitted over the entire area of the back light unit. Specifically, the edge of the back light unit adjacent the light source may be brighter than other areas of the back light unit. In order to prevent this phenomenon, a light guide plate may be used.

The light guide plate may convert linear light output from the light source, received at a side face of the light guide plate, into planar light, and may output the planar light from a front face of the light guide plate. Specifically, the light guide plate may uniformly project light emitted from the light source onto the front face of the light guide plate. However, when the light source is adjacent the side face of the light guide plate, the front face of the light guide plate may not be uniformly bright, but light may be concentrated at the front face away from the side surfaces.

To counter this effect, a rough surface, having a predetermined shape and location in accordance with the type and locations of the light sources, may be provided at the rear surface of the light guide plate to diffusely reflect light incident thereon, allowing light to be uniformly emitted from the entire surface of the light guide plate. As a result of the diffuse reflection, planar light having relatively high brightness and uniformity of light over the panel of the LCD device may be obtained.

However, the light intensity may now be higher at areas corresponding to the rough surface than the remainder of the rear face. This effect may be particularly pronounced as panel size increases, since the amount of light reaching the area far away from the light source may be insufficient, resulting in low light intensity in the area far away from the light source.

In order to solve the above-mentioned problems, i.e., in order to increase the uniformity of the light, a diffuser sheet may be disposed at the front surface of the light guide plate, and may uniformly diffuse light output from the light guide plate. However, after light has been diffused horizontally and vertically by the diffuser sheet, brightness of the light may be sharply decreased. Thus, a prism sheet may be provided at the front surface of the diffuser sheet, and may refract and condense light to increase brightness.

However, the use of the diffuser sheet and the prism sheet increase the manufacturing costs of the back light unit. Therefore, there is still a need for a more practical back light unit that outputs planar light having excellent visibility, high brightness and high uniformity.

SUMMARY OF THE INVENTION

The present invention is therefore directed to a light guide plate and a back light unit for a liquid crystal display (LCD) using the same, which substantially overcome one or more of the problems due to the limitations and disadvantages of the related art.

It is therefore a feature of an embodiment of the present invention to provide a light guide plate for a back light unit providing high brightness over the output surface thereof.

It is therefore another feature of an embodiment of the present invention to provide a light guide plate for a back light unit providing highly uniform light over the output surface thereof.

It is therefore yet another feature of an embodiment of the present invention to provide a light guide plate for a back light unit providing high visibility over the output surface thereof.

At least one of the above and other features and advantages of the present invention may be realized by providing a light guide plate, including a main body including opposing side faces, and front and rear faces connected to the opposing side faces, the front face being adapted to output light incident on at least one of the side faces, a plurality of front prisms disposed at the front face of the main body, and a plurality of dot prisms disposed in an array at the rear face of the main body, the dot prisms being spaced apart from each other, each of the dot prisms including prism parts, sizes of the dot prisms increasing as a distance from the at least one side face increases.

When light is incident on both side faces, sizes of the dot prisms may increase toward a central position between the side faces. When light is incident on only one of the side faces, sizes of the dot prisms may increase toward the opposing side face. The dot prisms may be staggered such that dot prisms in odd-numbered rows do not overlap dot prisms in even-numbered rows.

Each of the front prisms has one of a triangular lateral sectional shape, a trapezoidal lateral sectional shape, and a reverse-groove lateral sectional shape.

The prism parts of the dot prisms may have a longitudinal direction oriented perpendicular to the front prisms. A longitudinal direction of the prism parts of the dot prisms may be perpendicular to a direction of light incident on the main body. The front prisms are spaced a predetermined distance from each other such that planes are present between adjacent front prisms.

The light guide plate may include second dot prisms disposed between the dot prisms, wherein each of the second dot prisms has second prism parts, the second prism parts of each of the second dot prisms extending in a direction not parallel to a longitudinal direction of the prism parts of the dot prisms. The second dot prisms may be circular, elliptical, diamond-shaped, rectangular, or a combination thereof.

The dot prisms may have a circular shape, an elliptical shape, a diamond shape, a rectangular shape, or a combination thereof.

Each of the prism parts may have a triangular sectional shape with an interior angle of about 75 degrees to about 90 degrees.

The dot prisms may be elliptical, and have a ratio of a minor axis to a major axis being about 0.5 to about 0.9.

The front prisms may have a reverse-groove lateral sectional shape, an end of which is pointed and side surfaces of which are formed with a predetermined radius of curvature, the predetermined radius of curvature being about 0.01 mm to about 1.0 mm.

A ratio of an area occupied by the front prisms to an area occupied by spaces between the front prisms at the front face of the main body may be about 1:1 to about 0.1:1. A ratio of height to width of the prism parts may be about 0.5 to 0.7. A ratio of height to width of each of the front prisms is about 0.3 to about 0.5.

At least one of the above and other features and advantages of the present invention may be realized by providing a liquid crystal display back light unit, including a light source and a light guide plate having any of the above features.

BRIEF DESCRIPTION OF THE DRAWINGS

The above and other features and advantages of the present invention will become more apparent to those of ordinary skill in the art by describing in detail exemplary embodiments thereof with reference to the attached drawings, in which.

DETAILED DESCRIPTION OF THE INVENTION

Korean Patent Applications No. 10-2004-0080677, filed on Oct. 9, 2004, and No. 10-2005-0084462, filed on Sep. 12, 2005, in the Korean Intellectual Property Office, and entitled: "Light Guide Plate for Liquid Crystal Display Back Light Units and Liquid Crystal Display Back Light Unit Using the Same," are incorporated by reference herein in their entirety.

The advantages and features of the present invention and the method of accomplishing the advantages and features of the present invention will be clearly understood from the preferred embodiment of the present invention, which will be described hereinafter in detail in conjunction with the accompanying drawings. It should be noted, however, that the present invention is not limited to the embodiment but is embodied in various different forms. It should be noted, therefore, that the embodiment is provided merely to complete the disclosure of the present invention and to let those skilled in the art to which the present invention pertains to fully understand the scope of the present invention. The present invention is defined only by the accompanying claims. The same or similar elements are denoted by the same reference numerals even though they are depicted in different drawings.

Furthermore, it should be noted that the sizes of components constituting the present invention may be exaggerated in the accompanying drawings for the purpose of clarity. The description of a component that is "present in" or "connected to" another component means that the components may be brought into contact with each other, or the components may be spaced a predetermined distance from each other. In the case that the components are spaced a predetermined distance from each other, the description of a third unit for fixing or connecting the two spaced components to another component may be omitted.

Figure 1:
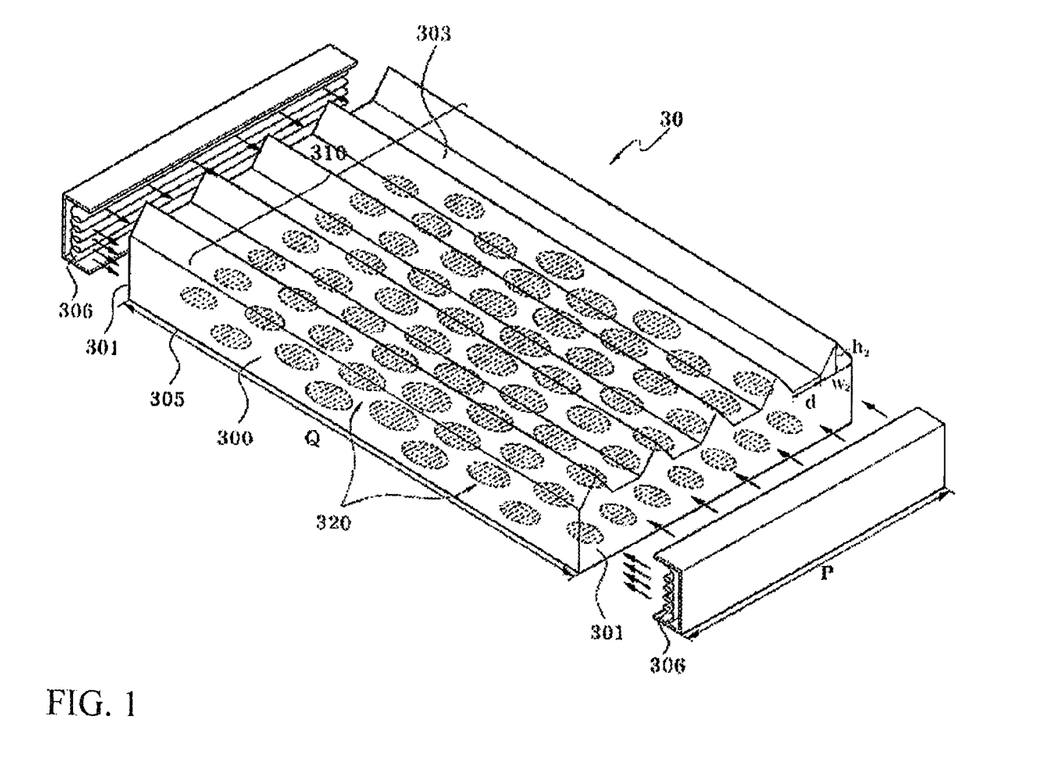
FIG. 1 illustrates a perspective view of a light guide plate according to an embodiment of the present invention.

FIG. 1 illustrates a perspective view showing a light guide plate 30 according to an embodiment of the present invention.

As shown in FIG. 1, the light guide plate 30 may include a main body 300, front prisms 310, and dot prisms 320. The light guide plate 30 may be made of a material having a high strength, i.e., is not easily broken or deformed, a light weight, and a high visible transmissivity, e.g., a transparent acryl material.

The main body 300 may include opposing side faces 301, upon at least one of which light is incident, a front face 303 connected to the side faces 301, and a rear face 305 connected to the side faces 301 and disposed opposite to the front face 303. The front face 303 may be disposed opposite a panel (not shown) of a liquid crystal display (LCD) device.

The side faces 301 are defined herein as the faces upon which light emitted from light sources 306 is incident. Therefore, the side faces 301 correspond to two faces 301 disposed adjacent to the light sources 306, respectively, as shown in FIG. 1. Various kinds of lamps may be used as the light sources 306, e.g., a cold cathode fluorescent lamp (CCFL).

The front face 303 and the rear face 305 may allow light emitted from the light sources 306 and incident upon the side faces 301 to exit therethrough. The front face 303 and the rear face 305 are connected to the side faces 301. The front face 303 has one surface disposed in the main body 300 and the other surface serving as an outer surface of the main body 300. Similarly, the rear face 305 has one surface disposed in the main body 300 and the other surface forming another outer surface of the main body 300. In other words, the front face 303, the rear face 305 and the side faces 301 may define a cavity of the main body 300.

Front prisms 310 having a predetermined sectional shape and serving to uniformly diffract, refract, and diffuse the light exiting through the main body 300, may be formed at the front face 303. The front prisms 310 may be formed on the outer surface of the front face 303, i.e., the surface adjacent a panel (not shown) of the LCD device, or may be on the other surface of the front face 303 disposed in the main body 300.

The front prisms 310 may be disposed over an entirety of the front face 303 while being spaced a predetermined distance d from each other. Specifically, each of the front prisms 310 may extend in a first direction indicated by an arrow Q, i.e., a direction in which light is emitted from each of the light sources 306, and the front prisms 310 may be arranged in a second direction indicated by an arrow P, the second direction being perpendicular to the first direction. The front prisms 310 extending in the first direction may be perpendicular to prism parts formed at the rear face 305, which will be described below.

Separating the front prisms 310 by a predetermined distance d from each other, rather than having them be immediately adjacent, may improve uniformity of light and visibility. Specifically, light exiting the main body 300 is diffracted, refracted, and diffused at a predetermined angle to the panel of the LCD device, which is opposite to the light guide plate 30, by the front prisms 310. When the front prisms 310 are spaced the predetermined distance d from each other, light progresses perpendicularly to the panel of the LCD device through the planes formed by the predetermined distance d, thus increasing uniformity of the light reaching the panel of the LCD device.

Figure 2:
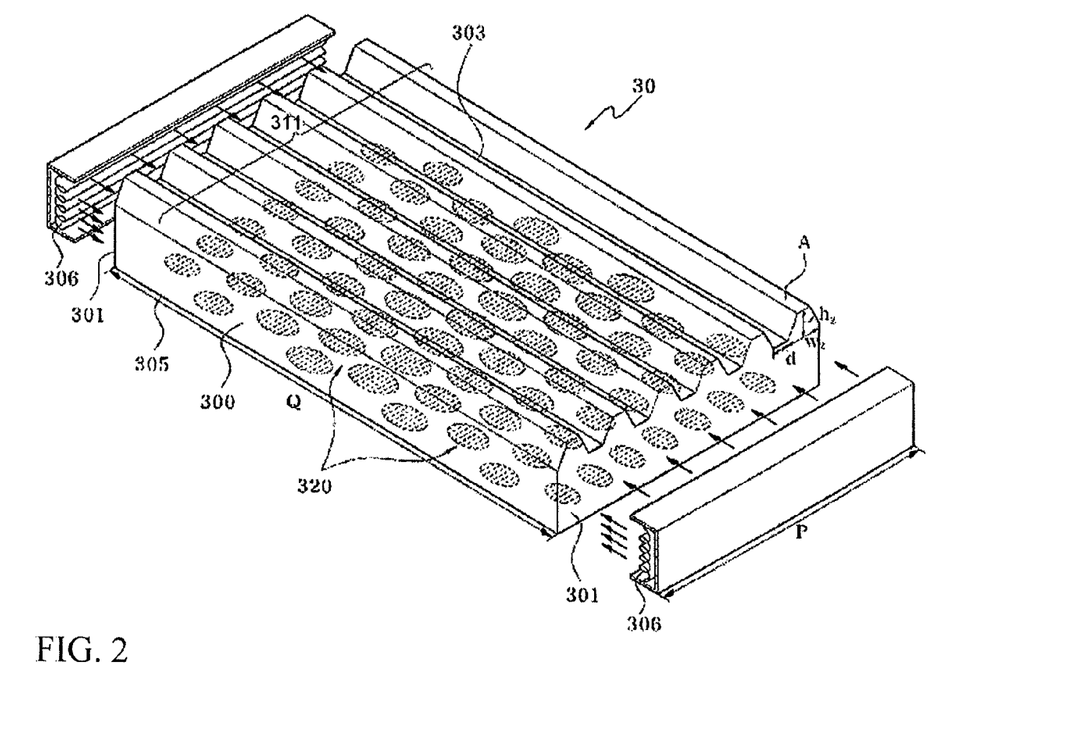
FIGS. 2 and 3 illustrate perspective views of light guide plates according to embodiments of the present invention.
Figure 3:
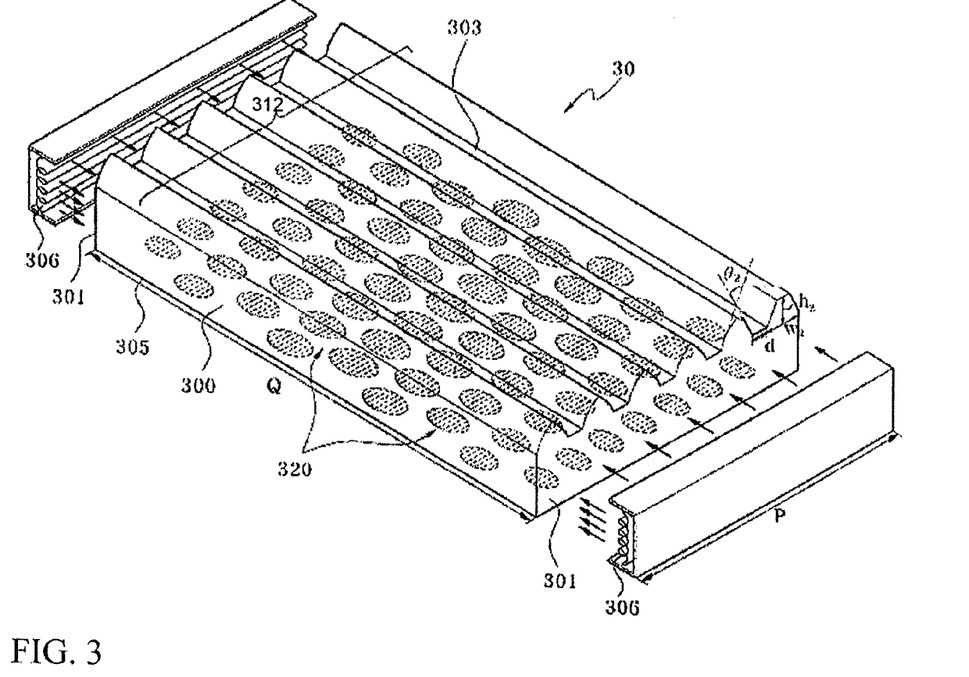

As shown in FIG. 1, the front prisms 310 may have a triangular lateral sectional shape of a height $h_2$ and a width $w_2$, although the front prisms 310 may have various different lateral sectional shapes. FIGS. 2 and 3 illustrate perspective views of various different examples of sectional shapes.

Referring to FIG. 2, front prisms 311 may have a trapezoidal lateral sectional shape. When the lateral sectional shape of each of the front prisms 311 is trapezoidal, light progresses perpendicularly to the panel of the LCD device through planes A formed at the upper parts of the respective trapezoidal front prisms 311. Other than planes A replacing the peaks of the triangular lateral section shape of the front prisms 310, the trapezoidal lateral sectional shape of the front prisms 311 may have the same dimensions as the triangular lateral section shape, i.e., may have the height $h_2$, the width $w_2$, and separation d.

Referring to FIG. 3, front prisms 312 may have a reverse-groove lateral sectional shape having a pointed end and side surfaces of a predetermined radius of curvature, defined by $\theta_2$. When the front prisms 312 have the reverse-groove lateral sectional shape, the predetermined radius of curvature of each of the side surfaces of each front prism 312 may be between about 0.01 to about 1.0 mm. Other than a top portion defined by $\theta_2$ replacing the peaks of the triangular lateral section shape of the front prisms 310, reverse-groove lateral sectional shape of the front prisms 312 may have the same dimensions as the triangular lateral section shape, i.e., may have the height $h_2$, the width $w_2$, and separation d.

A ratio of an area occupied by the front prisms 310, 311, 312 to an area occupied by the spaces between the front prisms 310 at the front face 303 of the main body 300 may be about 1:1 to about 0.1:1. If the ratio of the area of the front prisms 310, 311, 312 to the area of the spaces between the front prisms 310,311,312 is above about one, diffraction and diffusion effects may be lowered, decreasing brightness.

The ratio of the height $h_2$ to the width $w_2$ of each of the front prisms 310, 311, 312 may be about 0.3 to about 0.5. If the ratio of the height $h_2$ to the width $w_2$ is below about 0.3, the horizontal viewing angle may be unnecessarily increased, decreasing brightness. If the ratio of the height $h_2$ to the width $w_2$ is above about 0.5, on the other hand, the horizontal viewing angle may be unnecessarily decreased, resulting in unsatisfactory optical properties.

Referring to FIGS. 1 to 3, the rear face 305 of the main body 300 may include dot prisms 320 arranged in an array, i.e., lengthwise and crosswise, such that the dot prisms 320 are spaced apart. The dot prisms 320 may be formed on the outer surface of the rear face 305 of the main body 300 or the surface of the rear face 305 disposed in the main body 300.

Figure 4:
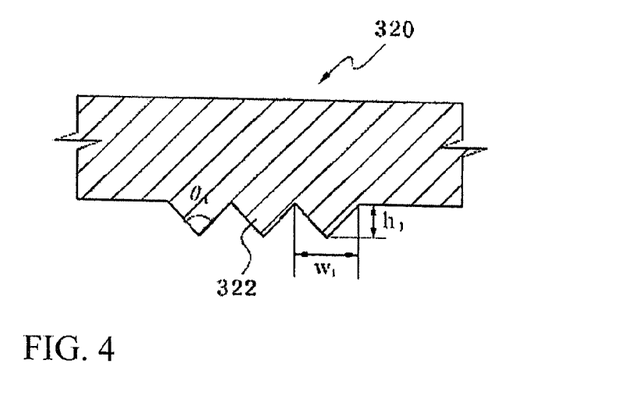
FIG. 4 illustrates an enlarged sectional view of a dot prism of the light guide plate according to an embodiment of the present invention.

FIG. 4 illustrates an enlarged sectional view of a dot prism 320 shown in FIGS. 1 to 3 formed on an outer surface of the rear face 305. As shown in FIG. 4, each of the dot prisms 320 may include prism parts 322 having a predetermined sectional shape, e.g., a triangular sectional shape as illustrated in FIG. 4.

Each of the prism parts 322, which may be formed at the face of each of the dot prisms 320, may extend in the second direction indicated by the arrow P, which is perpendicular to the first direction indicated by the arrow Q, in which light is emitted from each of the light sources 306. When the prism parts 322 extend in the second direction, light may be properly diffracted, refracted, and diffused.

The prism parts 322 formed at each of the dot prisms 320 also may extend in the second direction, i.e., perpendicular to the first direction, which is also the longitudinal direction of the front prisms 310. When the prism parts 322 extend in the second direction, light may be uniformly refracted and diffused.

When the lateral sectional shape of each of the prism parts 322 is triangular, as shown in FIG. 4, the triangle may have a height $h_1$, a width $w_1$ and an interior angle $\theta_1$. The interior angle $\theta_1$ of the triangle may be between about 75 degrees to about 90 degrees. If the interior angle $\theta_1$ is below about 75 degrees or above about 90 degrees, the angle between the exiting light and the direction perpendicular to the front face of the back light unit is increased, decreasing brightness at the center.

A ratio of the height $h_1$ to the width $w_1$ of each of the prism parts 322 may be about 0.5 to about 0.7. If the ratio of the height $h_1$ to the width $w_1$ of each of the prism parts 322 is below about 0.5 or above about 0.7, the angle between the exiting light and the direction perpendicular to the front face of the back light unit is increased, decreasing the brightness at the center.

FIGS. 5 to 8 illustrate plan views of various different examples of the shapes of the dot prisms 320.

Figure 5:
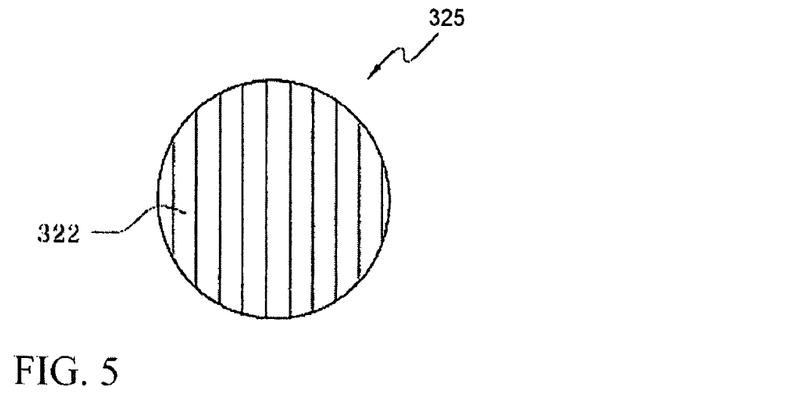
FIGS. 5 to 8 illustrate various shapes of dot prisms of the light guide plate according to embodiments of the present invention.
Figure 6:
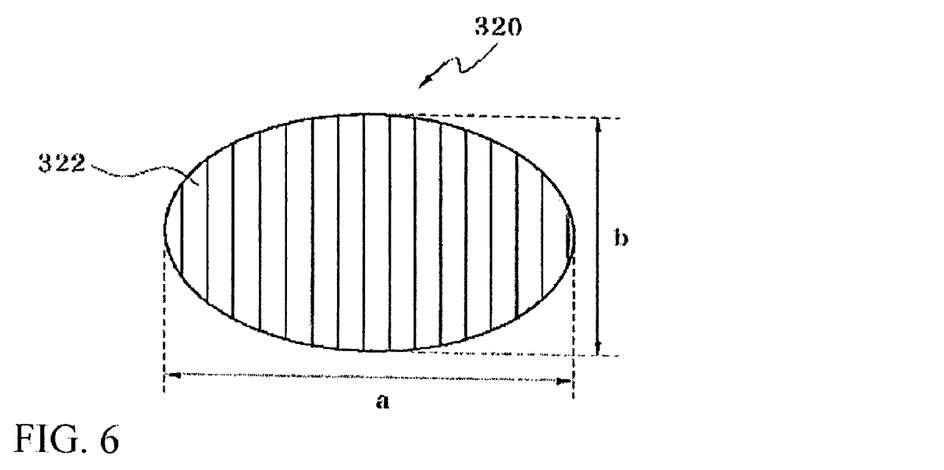
Figure 7:
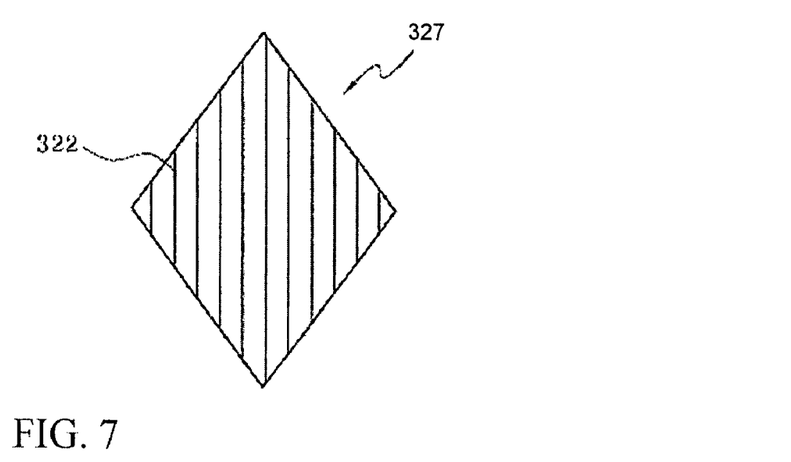
Figure 8:
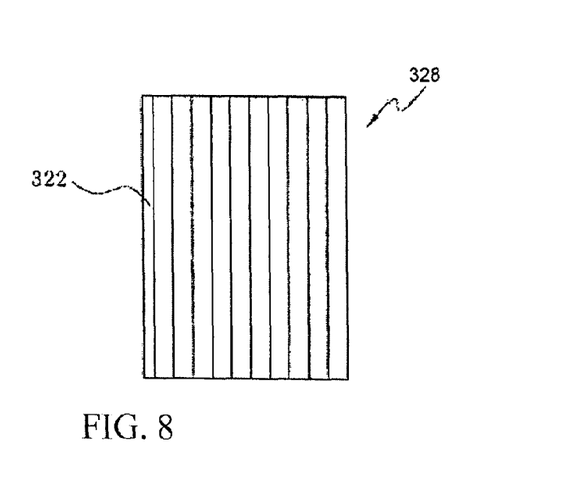

As shown in FIGS. 5 to 8, each of the dot prisms 320 may have a plurality of prism parts 322. Further, in addition to an elliptical shape of the dot prisms shown in FIGS. 1 to 3 and FIG. 6, dot prisms 325 may have a circular shape, as shown in FIG. 5, dot prisms 327 may have a diamond shape, as shown in FIG. 7, and dot prisms 328 may have a rectangular shape, as shown in FIG. 8. Alternatively, within the array of dot prisms, dot prisms may have a combination of the circular shape, the elliptical shape, the diamond shape, and/or the rectangular shape.

When each of the dot prisms 320 has the elliptical shape, as shown in FIG. 6, the ellipse may be defined by a minor axis b and a major axis a. A ratio of the minor axis b to the major axis a may be about 0.5 to about 0.9. If the ratio of the minor axis b to the major axis a is below about 0.5, optical properties, e.g., refraction and diffraction, may be unsatisfactory. If the ratio of the minor axis b to the major axis a is above about 0.9, visibility may be decreased.

Figure 9:
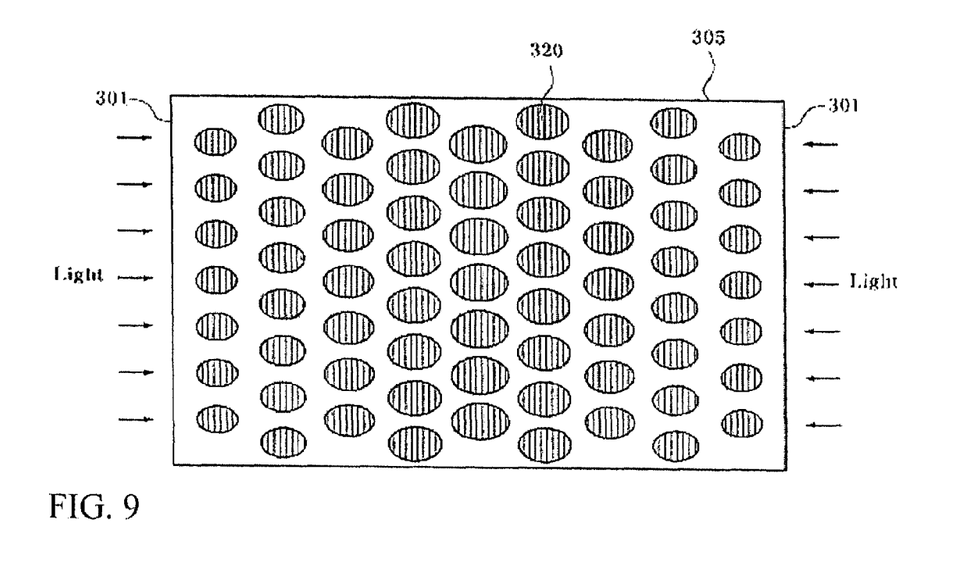
FIGS. 9 to 11 illustrate plan views of a rear face of the light guide plate according to embodiments of the present invention.
Figure 10:
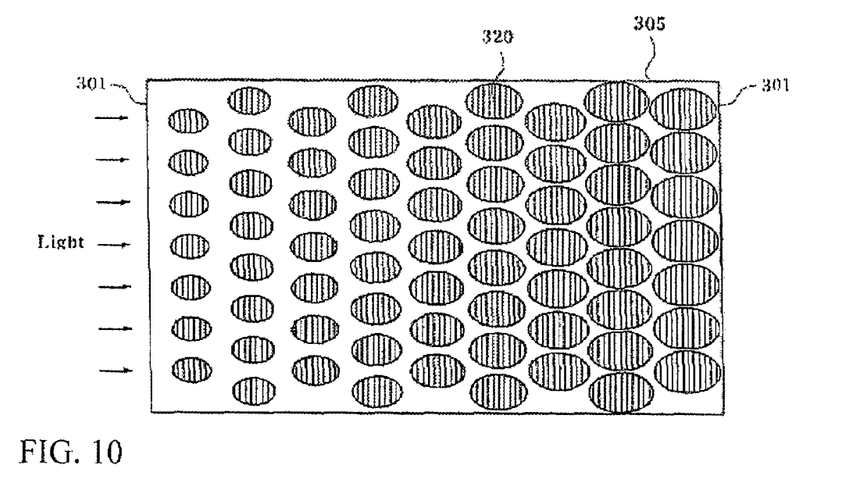
Figure 11:
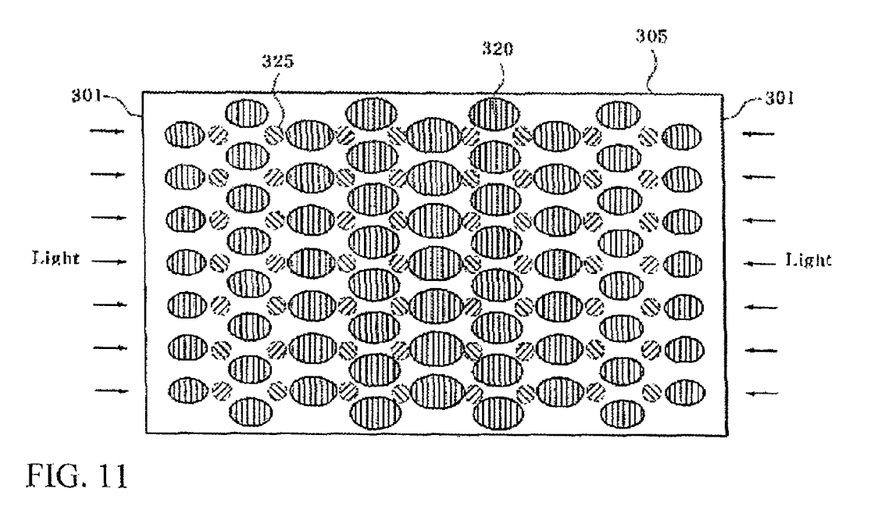

FIGS. 9 to 11 illustrate plan views of a rear face of the light guide plate for LCD back light units according to the present invention seen from under the main body of the light guide plate showing the arrangement of the dot prisms 322 according to embodiments of the present invention.

FIG. 9 illustrates a plan view showing the arrangement of the dot prisms 320 when each of the dot prisms 320 has the elliptical shape as shown in FIG. 6, and light emitted from the light sources 306 is incident upon both side faces 301 of the main body 300 of the light guide plate. When light is incident upon both the side faces 301, the dot prisms 320 may be arranged in a pattern in which sizes, i.e., areas occupied by the dot prisms, of the dot prisms 320 increase toward a center from the side faces 301.

Since light is being output to the front face 303 of the light guide plate 30 by the dot prisms 320, as light travels away from its respective incident face, the amount of light decreases. By increasing sizes of the dot prisms 320 further from the incident face, here towards the center, the amount of the refracted light and the amount of the reflected light increases, thereby outputting more uniform light from the front face 303 of the light guide plate 30.

FIG. 10 illustrates a plan view of an arrangement of dot prisms 320 having the elliptical shape, as shown in FIG. 6, when light is incident upon only one of the opposite side faces 301 of the main body 300 of the light guide plate. When light is incident upon only one of the side faces 301, the dot prisms 320 may be arranged such that sizes of the dot prisms 320 increase toward the other side face 301.

FIG. 11 illustrates a plan view showing another arrangement of the dot prisms 320. As shown in FIG. 11, a plurality of second dot prisms 325 having a circular shape may be disposed at the spaces between the dot prisms 320, i.e., the lattice, in addition to the dot prisms 320 shown in FIGS. 9. The prism parts of each of the second dot prisms 325 may extend in a direction that is not parallel to the longitudinal direction of the prism parts 322 formed at the face of each of the dot prisms 320. The second dot prisms 325 may further increase the refraction and reflection of the light.

As shown in FIGS. 9 to 11, the dot prisms 320 may be formed in the elliptical shape, although the dot prisms 320 may be formed in the circular shape, the diamond shape, or the rectangular shape, as shown in FIGS. 5, 7 and 8. When using alternative shapes, the dot prisms may be arranged in a pattern in which the sizes of the dot prisms increases as the dot prisms become more distant from an incident side face.

The second dot prisms 325 may be circular as shown in FIG. 14, although the second dot prisms 325 may be formed in another shape, e.g., triangular, rectangular shape, pentagonal, hexagonal, elliptical, or a diamond.

As shown in FIGS. 9 to 11, the dot prisms 320 may be arranged in an array, i.e., lengthwise and crosswise, at the rear face 305 of the main body 300 of the light guide plate 30 in a staggered fashion, such that columns formed by the dot prisms 320 of odd-numbered rows do not overlap columns formed by the dot prisms 320 of even-numbered rows. By arranging the dot prisms 320 in the staggered fashion, uniformity of the light output from the light guide plate 20 may be increased, improving visibility.

Several experimental examples of the present invention will be presented hereinafter to demonstrate that the brightness and the uniformity of the light, and the visibility are increased when the light guide plate according to embodiment of the present invention is used. Details that are not described herein will be apparent to those skilled in the art to which the present invention pertains without difficulty, and therefore, a description thereof will not be given.

In the following experimental examples, main body of the light guide plate was 332.5 mm in width (W), 441.5 mm in length (L), and 10.0 mm in thickness (T).

The experimental examples performed to demonstrate the effects of the present invention are as follows.

EXPERIMENTAL EXAMPLE 1

In experimental example 1, sizes of the dot prisms were kept constant, and front prisms were not spaced apart from each other. In particular, the dot prisms were elliptical dot prisms having 0.3 mm major axis and 0.2 mm minor axis, such that the elliptical dot prisms were arranged at intervals of 0.62 mm in the direction parallel with the light sources and at intervals of 1.08 mm in the direction perpendicular to the light sources. Prism parts in each of the dot prisms had a height of 30 μm, a width of 50 μm, and an interior angle of 82.5 degrees. The front prisms had a triangular shape, with a height of 13 μm and a width of 32 μm, formed over the entire front face of the light guide plate, i.e., the front prisms were not spaced apart from each other.

EXPERIMENTAL EXAMPLE 2

Experimental example 2 was the same as experimental example 1, except that sizes of the dot prisms were changed according to an embodiment of the present invention. In particular, the dot prisms were elliptical dot prisms, prisms having 0.3 mm major axis and 0.2 mm minor axis, such that the elliptical dot prisms were arranged at intervals of 0.62 mm in the direction parallel with the light sources and at intervals of 1.08 mm in the direction perpendicular to the light sources, adjacent to the side faces. The major axis of the dot prisms increased until, at the middle of the light guide plate, which was the farthest point away from the light sources, it was 0.5 mm.

EXPERIMENTAL EXAMPLE 3

Experimental example 3 was the same as experimental example 1, except the front prisms were spaced a predetermined distance from each other by a distance 32 μm.

EXPERIMENTAL EXAMPLE 4

Experimental example 4 employed the dot prisms of experimental example 2 and the front prisms of experimental example 3.

EXPERIMENTAL EXAMPLE 5

Experimental example 5 was the same as experimental example 4, except the front prisms had a reverse groove shape with a pointed end and side surfaces of a predetermined radius of curvature.

Samples of the experimental examples were measured in unit of $cd/m^2$ by a brightness measuring device. Twenty-five points were selected from the light-exiting surface of the back light unit, and the brightness values at the selected points were measured. Subsequently, the uniformity of the brightness (the minimum value/the maximum value×100) was measured from the measured brightness values. Further, visibility was determined by a person observing the presence of especially bright points or especially dark points.

The results of the brightness, uniformity, and visibility measured according to the above-described experimental conditions are indicated in Table 1. As can be seen from Table 1, the brightness and the uniformity were good in the case of experimental examples 1 to 4. However, in the case of experimental example 1, a number of minute dots were observed, therefore visibility was bad. In the case of experimental examples 2 to 4, only a few minute dots were observed, therefore visibility was excellent. In the case of experimental example 5, on the other hand, the brightness and the uniformity were good, and plane light having very good visibility without any dot-shaped bright points was obtained.

TABLE 1

|  | Experimental example 1 | Experimental example 2 | Experimental example 3 | Experimental example 4 | Experimental example 5 |
| --- | --- | --- | --- | --- | --- |
| Brightness (cd/m$^2$) | 3500~4000 | 5200~5500 | 3500~4000 | 5200~5500 | 5200~5500 |
| Uniformity (%) | 55 | 80 | 58 | 84 | 91 |
| Visibility | A number of minute dots are observed (improvement is required) | excellent | excellent | excellent | No minute dots are observed (very good) |

When the above-described light guide plate 30 in accordance with embodiments of the present invention has an equivalent effect to using a diffuser sheet and a prism sheet, which are generally used in the conventional LCD back light units, comparable viewing conditions may be realized, even without the diffuser sheet and the prism sheet. Consequently, in accordance with embodiments of the present invention, a light guide plate may provide planar light having excellent brightness, uniformity, and visibility.

As apparent from the above description, light emitted from the light sources may be uniformly refracted and diffused at the predetermined angle to the panel of the LCD device, and light may progress perpendicularly to the panel of the LCD device, when the light guide plate in accordance with embodiments of the present invention is used for LCD back light units. Consequently, embodiments of the present invention may illuminate an entire LCD device with excellent brightness, uniformity, and visibility. Furthermore, the LCD back light unit may be made without the diffuser sheet and/or the prism sheet.

Exemplary embodiments of the present invention have been disclosed herein, and although specific terms are employed, they are used and are to be interpreted in a generic and descriptive sense only and not for purpose of limitation. Accordingly, it will be understood by those of ordinary skill in the art that various changes in form and details may be made without departing from the spirit and scope of the present invention as set forth in the following claims.

What is claimed is:

1. A light guide plate, comprising:
    a main body including opposing side faces, and front and rear faces connected to the opposing side faces, the front face being adapted to output light incident on at least one of the side faces;
    a plurality of front prisms disposed at the front face of the main body;
    a plurality of dot prisms disposed in an array at the rear face of the main body, the dot prisms being spaced apart from each other, each of the dot prisms including prism parts, sizes of the dot prisms increasing as a distance from the at least one side face increases; and
    second dot prisms disposed between the dot prisms, wherein each of the second dot prisms has second prism parts, the second prism parts of each of the second dot prisms extending in a direction not parallel to a longitudinal direction of the prism parts of the dot prisms.

2. The light guide plate as claimed in claim 1, wherein, when light is incident on both side faces, sizes of the dot prisms increase toward a central position between the side faces.

3. The light guide plate as claimed in claim 1, wherein, when light is incident on only one of the side faces, sizes of the dot prisms increase toward the opposing side face.

4. The light guide plate as claimed in claim 1, wherein the dot prisms are staggered such that dot prisms in odd-numbered rows do not overlap dot prisms in even-numbered rows.

5. The light guide plate as claimed in claim 1, wherein each of the front prisms has one of a triangular lateral sectional shape, a trapezoidal lateral sectional shape, and a reverse-groove lateral sectional shape.

6. The light guide plate as claimed in claim 1, wherein the prism parts of the dot prisms have a longitudinal direction oriented perpendicular to a longitudinal direction of the front prisms.

7. The light guide plate as claimed in claim 1, wherein a longitudinal direction of the prism parts of the dot prisms is perpendicular to a direction of light incident on the main body.

8. The light guide plate as claimed in claim 1, wherein the front prisms are spaced a predetermined distance from each other such that planes are present between adjacent front prisms.

9. The light guide plate as claimed in claim 1, wherein the second dot prisms have a circular shape, an elliptical shape, a diamond shape, a rectangular shape, or a combination thereof.

10. The light guide plate as claimed in claim 1, wherein the dot prisms have a circular shape, an elliptical shape, a diamond shape, a rectangular shape, or a combination thereof.

11. The light guide plate as claimed in claim 1, wherein each of the prism parts has a triangular sectional shape with an interior angle of about 75 degrees to about 90 degrees.

12. The light guide plate as claimed in claim 1, wherein the dot prisms are elliptical, a ratio of a minor axis to a major axis being about 0.5 to about 0.9.

13. The light guide plate as claimed in claim 1, wherein the front prisms have a reverse-groove lateral sectional shape, an end of which is pointed and side surfaces of which are formed with a predetermined radius of curvature, the predetermined radius of curvature being about 0.01 mm to about 1.0 mm.

14. The light guide plate as claimed in claim 1, wherein a ratio of an area occupied by the front prisms to an area occupied by spaces between the front prisms at the front face of the main body is about 1:1 to about 0.1:1.

15. The light guide plate as claimed in claim 1, wherein a ratio of height to width of the prism parts is about 0.5 to 0.7.

16. The light guide plate as claimed in claim 1, wherein a ratio of height to width of each of the front prisms is about 0.3 to about 0.5.

17. A liquid crystal display back light unit, comprising:
    a light source; and
    a light guide plate, the light guide plate including:

a main body including opposing side faces, and front and rear faces connected to the opposing side faces, the front face being adapted to output light incident from the light source on at least one of the side faces, a plurality of front prisms disposed at the front face of the main body, a plurality of dot prisms disposed in an array at the rear face of the main body, the dot prisms being spaced apart from each other, each of the dot prisms including prism parts, sizes of the dot prisms increasing as a distance from the at least one side faces increases, and second dot prisms disposed between the dot prisms, wherein each of the second dot prisms has second prism parts, the second prism parts of each of the second dot prisms extending in a direction not parallel to a longitudinal direction of the prism parts of the dot prisms.

18. The liquid crystal display back light unit as claimed in claim 17, wherein, when light is incident on both side faces, sizes of the dot prisms increase toward a central position between the side faces.

19. The liquid crystal display back light unit as claimed in claim 17, wherein the front prisms are spaced a predetermined distance from each other such that planes are present between adjacent front prisms.

* * * * *